Jan. 24, 1956

B. R. CARSON 2,732,212

RECORD CHANGE CYCLE CONTROL SYSTEM
FOR AUTOMATIC RECORD CHANGERS

Filed Aug. 31, 1951

2 Sheets-Sheet 1

INVENTOR
BENJAMIN R. CARSON
BY
H. O. Newton
ATTORNEY

INVENTOR
BENJAMIN R. CARSON
BY H. L. Heuston
ATTORNEY 2,732,212
Patented Jan. 24, 1956

2,732,212

RECORD CHANGE CYCLE CONTROL SYSTEM FOR AUTOMATIC RECORD CHANGERS

Benjamin R. Carson, Haddonfield, N. J., assignor to Radio Corporation of America, a corporation of Delaware Application August 31, 1951, Serial No. 244,649

3 Claims. (Cl. 274—1)

Figure 1:
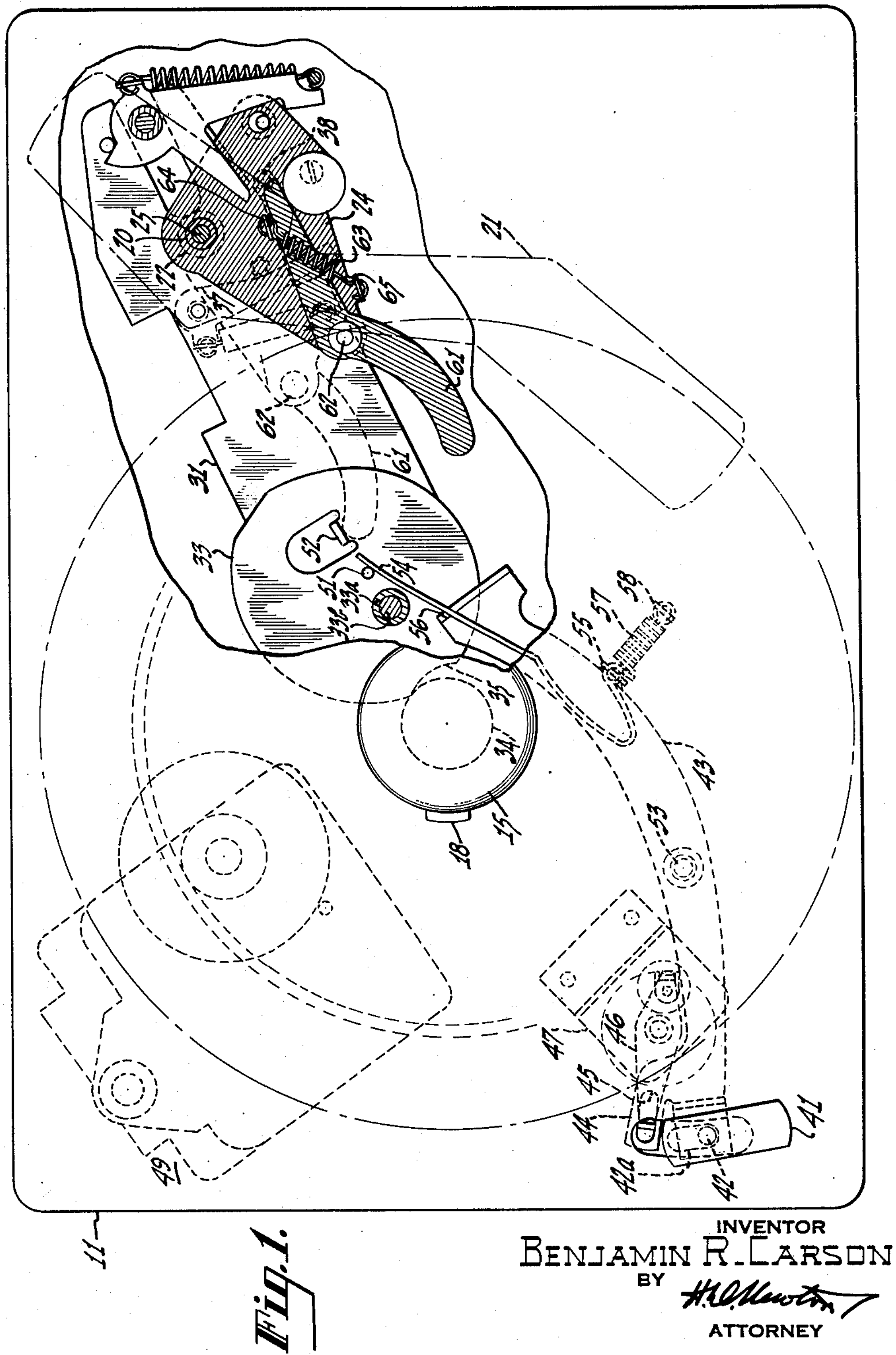

This invention relates to automatic record changers of the drop type, and more particularly to a record change cycle control system or mechanism for drop type automatic record changers.

More specifically, this invention relates to a slow speed automatic record changer of the type disclosed in a copending application of Benjamin R. Carson, Serial No. 84,502, now U. S. Patent 2,634,135, for Automatic Phonograph Record Playing Mechanisms, assigned to the same assignee as the present invention. This type of record changer utilizes a relatively large diameter turntable spindle or center post which supports a stack of small diameter records. The lowermost record of the stack is supported adjacent its center upon a pair of oppositely disposed and inwardly retractable record supports or shelves carried by the center post.

Periodically, at the completion of the playing of each record, a cam controlled record changing cycle is automatically initiated and a succeeding record drops onto the turntable to be played. This is accomplished under control of a central shaft within the center post which rotates with the center post during the playing cycle. During the record change cycle the shaft is stopped or blocked against rotation, and upon being held immobile during the continued rotation of the center post and turntable, it operates to move a pair of record separators outwardly between the lowermost and next lowermost records of the stack and to retract the shelves within the center post. The lowermost record drops onto the turntable to be played and the remaining records of the stack are supported upon the separators. Thereafter, upon further rotation of the center post and turntable, the shelves move outwardly and the separators are withdrawn inside the center post to their respective positions for the record playing cycle. The central shaft is then released to rotate with the center post during the playing cycle.

The stopping of the shaft and operation of the shelves and separators, as above described, is effected by a lever operable at the end of a record changing cycle to engage a toothed wheel fixed to the shaft at an end opposite to that which controls the shelves and separators. A cam fixed to the turntable moves the lever into engagement with the wheel to hold the shaft from rotation during record changing operations, after which the cam operates to release the lever.

For manually initiating a record changing operation during the playing of a record, a push or slide button may be provided to move the lever into engagement with the wheel as a substitute for the automatic operation at the end of a playing cycle, whereupon the cam holds the lever in such engagement until the shelves and separators operate as above described.

The present invention is particularly adapted for use in this and similar drop type automatic record changers which employ a movable record change cycle control element or slide, having an eccentric cam element operable upon slight movement to be engaged and rotated as the turntable rotates to move the slide, whereby the record change cycle control means is set into movement to effect stopping of the control shaft and the record changing cycle above described.

In a modern drop type record changer as above referred to, record change cycle control systems for initiating record change cycles must necessarily satisfy minimum space and cost requirements. Also, the component parts of such systems must be simple and adapted for dependable operation over a long operating life.

In such record changers, furthermore, it is necessary to locate manual trip control means for convenient manipulation and to provide a control connection therefor with the changer mechanism without interfering with other parts or their proper functioning and entirely independent of the automatic trip means which is normally controlled by the tone arm, otherwise the one may react on the other in a manner to interfere with proper functioning in the change cycle.

It is therefore an object of this invention to provide a record change cycle control system having a minimum number of component parts for manually and automatically initiating a record change cycle in drop type automatic record changers of the type referred to, with a single movable trip element.

It is another object of this invention to provide a record change cycle control system for initiating record change cycles in drop type automatic record changers utilizing an eccentric cam element as the trip means, which functions independently manually and automatically through such common means.

It is still another object of this invention to provide an improved record change cycle control system for automatic record changers which provides for convenient manual operation as well as automatic operation with a minimum number of parts of low cost construction and without interfering with the normal functioning of other parts of such record changers.

It is a further object of this invention to provide an improved system of the type referred to which functions independently manually and automatically in connection with a common movable trip element of the record changer mechanism.

In accordance with the foregoing objects, and in accordance with the invention, there is provided a record changer of the drop type having an eccentric cam element and a record change cycle control slide which it moves when resiliently engaged with sufficient force in one instance by a wire on a pivoted lever under the influence of a manual control knob or button to initiate a record changing cycle. In another instance, and independently of the manual control means, a spring biased trip lever rotating with the tone arm resiliently engages a second portion of the cam when the stylus, carried by the tone arm, reaches the end of a record whereupon a record changing cycle is initiated automatically.

Figure 2:
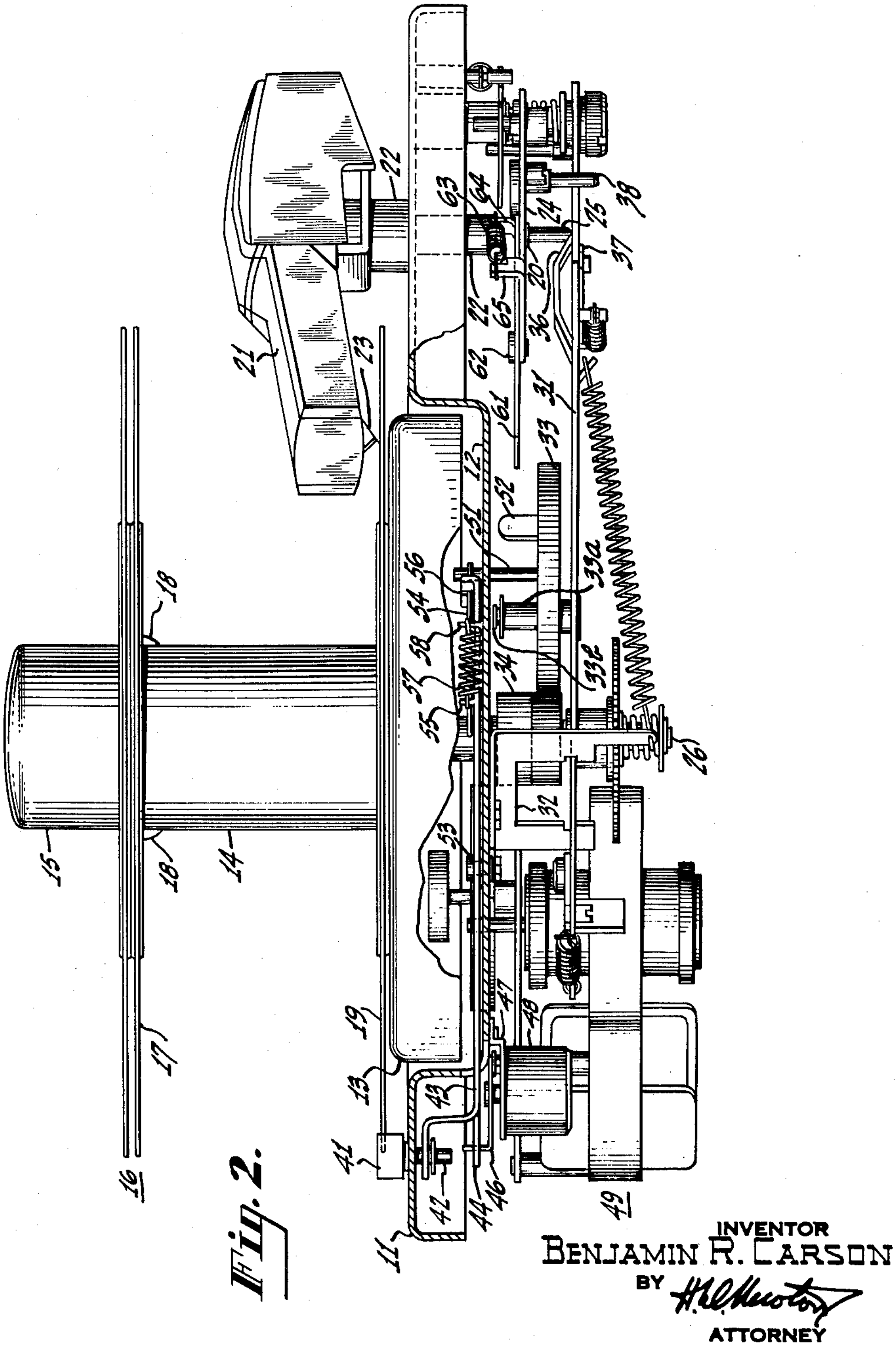

The invention is defined in the appended claims. However, further understanding of the invention will be obtained from the following description with reference to the accompanying drawings. In the drawings, Figure 1 is a top view of an automatic record changer provided with a record change cycle control system or mechanism embodying the invention; and Figure 2 is a side view of the record changer of Figure 1 showing further details of the construction of the record change cycle control system or mechanism in accordance with the invention.

Referring to the drawings, in which like reference characters indicate like elements throughout, the record changer is provided with a motor board 11 having a turntable well 12 in which a turntable 13 is rotatably mounted.

The turntable 13 carries a record receiving spindle or center post 14 of relatively large diameter, to the top of which is fitted a cap 15 of the same diameter which receives a stack of records 16. The lowermost record 17 of the stack rests on a pair of oppositely disposed record supporting shoulders or shelves 18 which project from the body of the center post 14 at the top thereof. A record 19 is shown carried on the turntable.

A tone arm 21 is pivotally mounted at one end thereof on a tone arm post 22, and the free end of the tone arm 21 carries a suitable sound reproducing or phonograph pick-up device (not shown) which is provided with a suitable stylus 22 for engaging the sound grooves of the record 19. A bushing 20 extending through the tone arm post 22 mechanically couples the tone arm 21 and a trip lever assembly plate 24, thus providing for horizontal rotation of the tone arm 21 with the trip lever assembly plate 24 about the tone arm post 22. The tone arm is provided with an elevating rod 25 located within the bushing 20 and extending below the trip lever assembly plate 24, representing any suitable arrangement for raising and lowering the tone arm.

Record changing apparatus comprising the shelves 18 and a pair of record separating blades (not shown) are housed in the center post 14. Such record changing apparatus is operable by a shaft 26 which extends from below the turntable well 12 up into the center post 14 between the shelves 18 and such blades. The shaft rotates with the center post between record changing cycles and is adapted upon being stopped, while the center post and turntable continue to rotate, to effect the operation of the record changing apparatus in a well known manner, as by camming or forcing such blades out to support the records above the lowermost record 17 of the stack and permitting the shelves 18 to be withdrawn inside the center post to let the lowermost record 17 drop to the turntable to be played.

A movable record change cycle control element or cycle control slide 31 adapted for horizontal sliding movement transversely to the axis of the shaft 26 between downwardly extending arms of a U-shaped guide member 32 fixed to the bottom of the turntable well 12, has a cam 33 eccentrically mounted thereon to rotate on a pivot sleeve 33*a* about a fixed pivot shaft 33*b* on the slide. A knurled roller 34 adapted to rotate with the turntable 13 and center post 14 is mounted concentric with the shaft 26 adjacent the bottom of the turntable well 12.

Between record changing cycles, or during the normal playing of a record, the knurled roller 34, which projects through an opening provided in the control slide 31, rotates in a cut-away portion 35 of the cam 33 in a neutral inoperative position of the cam 33. A record changing cycle is started when slight rotation of the cam 33 occurs and the knurled roller 34 engages the outer peripheral edge of the cam, as indicated in Figure 1. When this occurs, continued rotation of the knurled roller, and consequent rotation of the cam 33, effects sliding movement of the control slide 31, whereupon the tone arm 21 is raised, as for instance by the elevating rod 25 riding up an incline 36 pressed in the control slide 31, and rotated outwardly about the tone arm post 22, by virtue of engagement of a member 37 located on the control slide with a downwardly projecting stud 38 (Figure 1) fixed to the trip lever assembly plate 24 and located in the path of such member 37.

In accordance with the invention, to provide means for imparting movement to the cam 33 to initiate a record change cycle, a slidable control knob or button 41 on top of the motor board is provided with a pin 42 which extends through a small elongated slot or opening 42*a* in the motor board and which is fixed to a start-reject lever 43. The lever 43 extends into and across the turntable well 12 to a point adjacent the eccentric trip cam 33.

A portion 44 of the start-reject lever 43 below the control knob 41 is provided with a slot 45 in which is located one end of a small lever 46 pivotally mounted on a plate 47 fixed to the bottom of the turntable well 12. The free end of the small lever 46 is adapted upon movement of the control knob 41 to manipulate a power switch 48 for operating a motor 49 which drives the turntable 13 at a relatively low speed in a well-known manner.

The cam 33 is provided with a pair of studs 51 and 52, one of which studs 51 projects from the plane of the cam 33 upward into the turntable well 12. The start-reject lever 43 projecting into the turntable well 12, is pivoted at some point between its ends to the turntable well as indicated at 53, and a spring wire 54 fixed to a lug 55 on the start-reject lever 43 projects through an open slot 56 in the upturned free end of said start-reject lever past the stud 51 which extends up into the turntable well 12. A tension spring 57 having one end fixed to the turntable well 12, as indicated at 58, and having its other end fixed to the lug 55 on the start-reject lever 43 is employed to bias the start-reject lever so as to prevent the spring wire 54 from engaging the stud 51 during normal playing operations.

When it is desired to initiate a record-changing cycle, as when the turntable is first set into rotation, or when during the playing of a record it is desired to play a succeeding record, the control knob 41 is moved to the position shown in Figure 1, to cause the start-reject lever 43 to move about its pivot 53 against the biasing force of the tension spring 57 and urge the spring wire 54 into contact with the end of the stud 51 which projects up into the turntable well 12 thereby to move the cam 33 sufficiently to effect a record changing cycle as hereinbefore described.

The spring wire arrangement for tripping the eccentric cam is at present preferred because it provides sufficient resilience to prevent damage to the stud 51 and to the cam mechanism, when the spring wire 54 strikes the stud 51 to urge the cam 33 into engagement with the knurled roller 34.

For automatic operation, a trip lever 61 pivotally mounted on the trip lever assembly plate as indicated at 62, and pivotally movable therewith about the tone arm post 22, is provided with a small tension spring 63 connected between two vertical lug projections 64, 65 fixed respectively to the trip lever 61 and the trip lever assembly plate 24. Since the trip lever rotates with the trip lever assembly plate 24, it moves inwardly therewith as the stylus 23 and tone arm 21 follow the grooves of a record inward in the usual manner. When the end of a record is reached, the end of the trip lever 61 engages the stud 52 on the cam 33, which position of the trip lever is shown in dotted lines in Figure 1, and effects the movement of said cam sufficiently to initiate a record changing cycle in the above described manner.

As in the case of the start-reject lever 43, a desired degree of resiliency when the trip lever 61 strikes the stud 52 is provided by the small tension spring 63.

In the record changer mechanism described, improved means for initiating and controlling the record change cycle is provided by a few parts or elements of low cost construction. The eccentric cam is the common element and is connected with either trip mechanism only momentarily. Thus both tripping functions, manual and automatic, are independent, one of the other, and do not interfere with normal operation of the record changer.

What is claimed is:

1. In an automatic phonograph record changer the combination with a motor, a power switch for said motor, a turntable driven by the motor, a control button for operating said power switch, and a tone arm pivoted at one end for movement across said turntable, of a movable record change cycle control slide having a rotary drive cam therefor eccentrically mounted thereon for rotation from a neutral inoperative position to move the slide and initiate a record change cycle, means providing at least one stud projection on said cam whereby it is actuated to move from said neutral position, a first resilient lever means coupled to said control button for movement in one direction to engage said stud projection means and actuate said cam, whereby said control button effectively controls said motor and the record change cycle operation jointly, and a second resilient lever means coupled to said tone arm for engaging said stud projection means upon movement of the tone arm to a predetermined position automatically to initiate a record change cycle independently of the control button.

2. In an automatic phonograph record changer the combination with a motor, a power switch for said motor, a turntable driven by the motor and having a record receiving center post containing record changing apparatus, a control button for operating said power switch, and a tone arm pivoted at one end for movement across said turntable, of a movable record change cycle control slide for controlling record change cycles, a rotary cam eccentrically mounted on said control slide, a shaft extending through said turntable into said center post and adapted upon being held stationary during rotation of said turntable and said center post to manipulate said record changing apparatus, said cam being adapted to be moved slightly to be engaged by a knurled roller rotating with said turntable and operable thereby to impart movement to said control slide for starting a record change cycle, a start-reject lever coupled to said control button, a spring wire extension on said start-reject lever, a trip lever assembly plate coupled to said tone arm and adapted for pivotal movement therewith, a trip lever pivotally mounted on said trip lever assembly plate, a trip lever return spring connecting said trip lever and said trip lever assembly plate, a first stud on said cam adapted to be resiliently engaged automatically by the end of said trip lever at a predetermined position of said tone arm, and a second stud on said cam adapted to be resiliently engaged by said spring wire extension independently and manually upon pivotal movement of said start-reject lever under the influence of said control button.

3. In an automatic phonograph record changer the combination with a motor, a power switch for said motor, a turntable driven by the motor, a control button for operating said power switch, and a tone arm pivoted at one end for movement across said turntable, of a movable record change cycle control slide having a rotary driven cam therefor eccentrically mounted thereon for rotation from a neutral inoperative position to move the slide and initiate a record change cycle, means providing a first and a second stud projection on said cam, a first resilient lever means coupled to said control button for movement in one direction to engage said first stud projection and actuate said cam to move from said neutral position whereby said control button effectively controls said motor and the record change cycle operation jointly, and a second resilient lever means coupled to said tone arm for engaging said second stud projection upon movement of the tone arm to a predetermined position automatically to initiate a record change cycle independently of the control button.

References Cited in the file of this patent

UNITED STATES PATENTS

| | | |
|---|---|---|
| 2,331,383 | Faulkner | Oct. 12, 1943 |
| 2,371,362 | Small | Mar. 13, 1945 |
| 2,536,432 | Faulkner | Jan. 2, 1951 |
| 2,640,705 | Mortimer | June 2, 1953 |

FOREIGN PATENTS

| | | |
|---|---|---|
| 632,956 | Great Britain | Dec. 5, 1949 |